United States Patent
Lanticq et al.

(10) Patent No.: US 10,794,733 B2
(45) Date of Patent: Oct. 6, 2020

(54) OPTOELECTRONIC DEVICE FOR DISTRIBUTED MEASUREMENT BY MEANS OF OPTICAL FIBRE

(71) Applicant: FEBUS OPTICS, Pau (FR)

(72) Inventors: Vincent Lanticq, Pau (FR); Pierre Clément, Pau (FR); Etienne Almoric, Pau (FR)

(73) Assignee: FEBUS OPTICS, Pau (FR)

( * ) Notice: Subject to any disclaimer, the term of this patent is extended or adjusted under 35 U.S.C. 154(b) by 0 days.

(21) Appl. No.: 16/611,747

(22) PCT Filed: May 14, 2018

(86) PCT No.: PCT/IB2018/053353
§ 371 (c)(1),
(2) Date: Nov. 7, 2019

(87) PCT Pub. No.: WO2018/207163
PCT Pub. Date: Nov. 15, 2018

(65) Prior Publication Data
US 2020/0109971 A1    Apr. 9, 2020

(30) Foreign Application Priority Data

May 11, 2017    (FR) ...................................... 17 54158

(51) Int. Cl.
*G01D 5/353*    (2006.01)
*G01K 11/32*    (2006.01)
(52) U.S. Cl.
CPC ......... *G01D 5/35358* (2013.01); *G01K 11/32* (2013.01); *G01K 2011/322* (2013.01)
(58) Field of Classification Search
CPC ........... G01D 5/35303; G01D 5/35306; G01D 5/35325; G01D 5/35332; G01D 5/35354;
(Continued)

(56) References Cited

U.S. PATENT DOCUMENTS

| 7,283,216 B1 | 10/2007 | Geng et al. |
| 7,397,544 B2 * | 7/2008 | Ukita ................... G01M 11/319 356/73.1 |

(Continued)

FOREIGN PATENT DOCUMENTS

| JP | 2010217029 A | 9/2010 |
| WO | 2008047329 A2 | 4/2008 |

(Continued)

OTHER PUBLICATIONS

International Search Report and Written Opinion in PCT/IB2018/053353 dated Jan. 4, 2019, 11 pages.

*Primary Examiner* — Gordon J Stock, Jr.
(74) *Attorney, Agent, or Firm* — Pearne & Gordon LLP

(57) ABSTRACT

The invention relates to an optoelectronic distributed measuring device based on optical fiber, said device comprising a continuous light source (1) emitting a continuous light signal at a first frequency $v_0$, an acousto-optical modulator (6) capable of transforming said continuous signal into a pulse signal to be injected into an optical fiber (15) to be tested, and a photodetection module (10) capable of detecting a backscattering signal from a Rayleigh backscattering and a spontaneous Brillouin backscattering from said optical fiber (15) to be tested, said device being characterized in that it further comprises a first coupler (3) and a second coupler (9), said second coupler (9) being capable of mixing the signal of the local oscillator with the backscattering signal from said optical fiber (15) to be tested before transmitting it to the photodetection module (10),
the backscattering signal being modulated at least at a frequency $v_{rB}$ equal to $v_0 - v_{bref} + v_A + v_{bAS}$, where $v_{bAS}$ is the anti-Stokes Brillouin (backscattering) frequency, and preferably also modulated at a frequency $v_{rR}$ equal to $v_0 + v_A$ of a Rayleigh backscattering measurable at any point z of said optical fiber (15), and (Continued)

Figure 1:
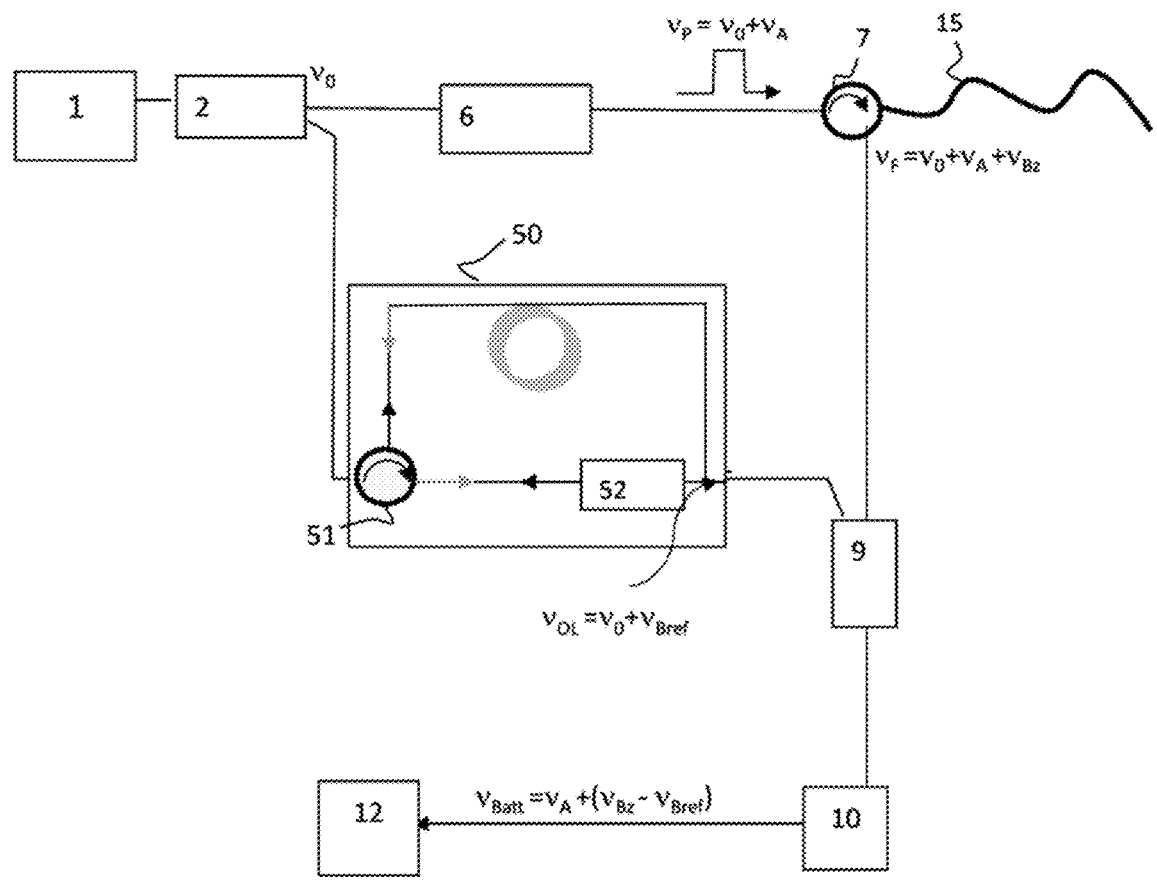

said photodetection module (10) being capable of transmitting the received backscattering signal to a processing module (12) capable of linking said anti-Stokes Brillouin frequency $v_{bAS}$ to a temperature value or a deformation value at any point z of said optical fiber (15) to be tested.

18 Claims, 5 Drawing Sheets

(58) Field of Classification Search
CPC ........... G01D 5/35358; G01D 5/35361; G01D 5/35364; G01K 2011/322; G01K 11/32; G01M 11/30; G01M 11/31; G01M 11/3109; G01M 11/3145; G01M 11/3172; G01M 11/319
USPC ....... 356/32, 35.5, 73.1; 250/227.14, 227.16, 250/227.18, 227.19, 227.21; 385/12, 13
See application file for complete search history.

(56) References Cited

U.S. PATENT DOCUMENTS

| | | | |
|---|---|---|---|
| 7,907,285 B2* | 3/2011 | Ukita | G01M 11/3172 |
| | | | 356/485 |
| 8,744,782 B2* | 6/2014 | Chen | G01K 11/32 |
| | | | 702/41 |
| 9,322,740 B2* | 4/2016 | Liu | G01D 5/35329 |
| 9,429,450 B2* | 8/2016 | Hartog | G01D 5/35364 |
| 9,645,018 B2* | 5/2017 | Lee | G01K 15/005 |
| 10,274,345 B2* | 4/2019 | Lanticq | G01D 5/35303 |
| 10,359,302 B2* | 7/2019 | Hartog | G01H 9/004 |
| 2001/0050768 A1* | 12/2001 | Uchiyama | G01M 11/3181 |
| | | | 356/73.1 |
| 2019/0195731 A1* | 6/2019 | Furukawa | G01L 1/242 |

FOREIGN PATENT DOCUMENTS

| | | |
|---|---|---|
| WO | 2013185810 A1 | 12/2013 |
| WO | 2015040566 A1 | 3/2015 |

* cited by examiner

OPTOELECTRONIC DEVICE FOR DISTRIBUTED MEASUREMENT BY MEANS OF OPTICAL FIBRE

FIELD OF THE INVENTION

The invention relates to an optoelectronic distributed measuring device based on optical fiber. More precisely, the invention relates to an optoelectronic device capable of measuring the parameters of the Brillouin and Rayleigh backscattering spectra and that may include a means capable of separating the temperature distributed measurement and the deformation distributed measurement.

Such devices may be used for permanently controlling the integrity and safety of systems and structures in civil engineering or the oil industry.

PRIOR ART

Optoelectronic distributed measuring devices based on optical fiber are generally used for measuring, in real time, the temperature and the deformations of large infrastructures in order to monitor their structural health and to ensure their maintenance. They provide, with each measurement, the temperature and deformation information at any point of the optical fiber connected to them. The measurements are generally carried out with a range of a few meters to several tens of kilometers and a metric or even centimetric resolution. Thus, for example, a measurement can be carried out every meter on a work with a length of 20 kilometers.

Optoelectronic distributed measuring devices based on optical fiber using the Brillouin backscattering phenomenon are already known and used for temperature and deformation measurement applications in civil engineering. A particularly privileged context for these systems is monitoring linear works such as bridges, dams, hydraulic earth dikes, or networks for transporting fluids (water, hydrocarbons, gas) in order to control the ground movements (sliding, settling), or the deformations of buried or non-buried pipes.

In order to analyze intensity variations over tens of kilometers with a metric spatial resolution, the measurement systems generally use optical time domain reflectometry OTDR (English acronym for "Optical Time Domain Reflectometry"). OTDR consists in propagating a light pulse in the optical fiber to be analyzed and measuring the return intensity as a function of time. The time needed for the backscattered light to be detected allows to locate the event to be measured (coordinate of a point z along the optical fiber). Spatial resolution is then a function of the width of the light pulse: a pulse with a width of 10 ns resulting for example in a resolution of about 1 m. Thanks to the Brillouin backscattering phenomenon combined with the OTDR technique, temperature and deformation measurements are carried out all along the fiber, over several tens of kilometers, with a metric or even centimetric resolution.

The measurements along the fiber are carried out with a device as shown schematically in FIG. 1. The light from a light source 1, such as a laser, is distributed into two arms. One of the arms, called a "pump", allows to send the light signal, in a pulsed form, through an acousto-optic modulator 6, in the optical fiber 15 to be tested. A signal is backscattered by the optical fiber 15, according to the Brillouin phenomenon. According to the Brillouin phenomenon, the spectrum components of light backscattering by the material constituting the optical fiber, in general silica, have a frequency $vB_z$ shifted from that $v_0$ of the incident light wave. The Brillouin frequency shift is generally of the order of 11 GHz for an incident wave of a wavelength $\lambda_0=1550$ nm. Such a frequency is very high. In order to perform the processing on the backscattered signal, it is possible to transpose the frequency to a lower frequency to reduce the bandwidth of the detector to be used, and therefore eliminate a large part of the noise. To this end, a heterodyne detection is carried out which consists in recombining the backscattered signal to be analyzed with a wave from the other arm, called a "local oscillator" 50. This local oscillator 50 may for example be in the form of a Brillouin ring laser. In this case, the continuous light signal with a frequency $v_0$ is directed to a circulator 51 which in turn directs it to a reference fiber. This reference fiber emits by amplified spontaneous scattering radiation in the opposite direction with a frequency $v_0-v_{Bref}$ that the circulator sends to a coupler 52. The latter sends a portion of the energy to the output signal, while it redirects the other portion to the reference fiber where the radiation is amplified by a gain factor G by stimulated Brillouin scattering (spontaneous and amplified) before being redirected to the circulator 51 which sends the amplified radiation back to the coupler 52 and the output. The local oscillator 50 then forms a stimulated Brillouin scattering amplification ring. A photodetector 10 allows to recover the beat of the two signals. The recovered beat is then amplified, and then transmitted to an electric spectrum analyzer 12. Such an optoelectronic distributed measuring device based on Brillouin scattering in an optical fiber, using a single laser frequency to generate a light pulse, is more particularly described in document U.S. Pat. No. 7,283,216. Document JP 2010 217029 describes another optoelectronic distributed measuring device based on Brillouin scattering using a single laser frequency to generate a light pulse. The device aims, through heterodyne detection, to reduce the light reception bandwidth of the Brillouin backscattering light so as to reduce costs and facilitate the processing of the backscattered light. To this end, the device includes a reference fiber similar to the test fiber in order to measure a frequency difference between the backscattering lights of the reference line and the line to be tested. However, one of the disadvantages of these devices is that they have long measurement durations. Indeed, typically, the measurement duration is greater than 1 minute for a 10 km fiber.

In addition, during the Brillouin backscattering measurement, the temperature and deformation parameters both create the same physical phenomenon in the optical fiber (variation of the Brillouin backscattering frequency $v_B$). Thus, the Brillouin frequency $v_B$ linearly depends on the temperature and deformation in the material. The frequency shift $\Delta v_B$ between the incident wave and the backscattered wave therefore varies with the temperature variations $\Delta T$ and the deformation variations $\varepsilon$ according to the equation: $\Delta v_B = C_T \Delta T + C_\varepsilon \varepsilon$, where $C_T$ and $C_\varepsilon$ are the temperature and deformation sensitivity coefficients specific to the optical fiber used, respectively. Thus, at present it is impossible to differentiate between the temperature parameter and the deformation parameter on the same Brillouin backscattering measurement.

The only way to solve this problem with this type of device is to fix one of the two stresses, either by mechanically attaching the optical fiber to be able to measure only the temperature, or by thermally insulating or by approximating that the temperature is stable around the optical fiber in order to measure only the deformation. These methods are never 100% effective and there is always a residual uncertainty in the measurement because it is impossible to guarantee that a fiber is protected from all stresses (for example friction or crushing of the tube) especially when the cable containing it is no longer accessible.

Other solutions have been provided such as temperature distributed measurements based on Raman scattering (Alahbabi, M. N., et al. *Optics Letters* 30, no. 11 (Jun. 1, 2005): 1276-78) and using this measurement to subtract the effect of the temperature on the Brillouin frequency in order to determine the deformation. But this often poses significant implementation difficulties because the two measurements are not carried out in the same fiber, and two separate instruments are used. Therefore, a perfect spatial alignment of the measurements of both instruments is necessary. There is also a high complexity, a deterioration in accuracy, particularly related to the cumulative deviations of the two devices, and also an additional cost associated with the purchase of two devices and the use engineering of the two measurements to translate the results into simultaneous temperature and deformation measurements (for example alignment of the measurement grids, estimation of uncertainties, correction of the deviations). Finally, systems relying on two separate measurements generally produce poor quality results because errors associated with the two measurements generally accumulate and there is a deviation in the transfer functions of each measurement that must be considered in the uncertainty of long-term measurements.

Thus, there is also a need for a device capable, in a single measurement and from a single optical fiber to be tested, of differentiating between the temperature parameter and the deformation parameter.

TECHNICAL PROBLEM

The invention therefore aims to overcome the disadvantages of the prior art. The invention aims in particular to provide an optoelectronic distributed measuring device based on optical fiber, simple and compact and capable of producing a more accurate and rapid measurement without or with little interference at low frequencies. To this end, the optoelectronic device has a new architecture allowing the generation of a local oscillator causing no or little interference signals. A reference fiber is included in the "pump" arm to generate an amplified spontaneous diffusion signal for eliminating all the necessary prior checks.

The invention also aims to provide an optoelectronic distributed measurement device based on optical fiber, capable, in a single measurement and from a single optical fiber to be tested, of differentiating the temperature parameter and the deformation parameter. To this end, the optoelectronic device has a new architecture allowing for a simultaneous measurement of the Brillouin backscattering anti-Stokes and Rayleigh backscattering line.

In addition, the device provided according to the invention allows to carry out analyses much faster than the devices of the prior art while including fewer energy consuming elements than the existing systems described in the prior art, which makes it possible to have a portable device suitable for interventions by a foot operator or for occasional measurements.

BRIEF DESCRIPTION OF THE INVENTION

To this end, the optoelectronic distributed measuring device based on optical fiber according to the invention comprises a continuous light source emitting a continuous light signal at a first frequency $v_0$, a modulator capable of imposing a frequency shift of at least 100 MHz on the continuous signal and transforming it into a pulse signal to be injected into an optical fiber to be tested, and a photodetection module capable of detecting a backscattering signal, from the optical fiber 15 to be tested, resulting from an amplified spontaneous Brillouin backscattering and/or from a Rayleigh backscattering from said optical fiber to be tested, said device being characterized in that it further comprises a first coupler and a second coupler, said first coupler being capable of dividing said continuous light signal into two signals of identical frequency distributed into two arms, a first arm connecting the first coupler to a reference fiber block including a reference fiber, said reference fiber block being capable of emitting another light signal with a frequency $v_0 - v_{bref}$, where $v_{bref}$ is the Brillouin frequency of the reference fiber without deformation and at a reference temperature, a second arm connecting the first coupler to the second coupler located upstream of the photodetection module and capable of transmitting to the second coupler a continuous light signal at a frequency $v_0$, thus constituting a local oscillator, said second coupler being capable of coupling the signal of the local oscillator to the backscattering signal from said optical fiber to be tested before transmitting it to the photodetection module, the backscattering signal being modulated at a frequency $v_{rB}$ equal to $v_0 - v_{bref} + v_A + v_{bAS}$, where $v_{bAS}$ is the anti-Stokes Brillouin backscattering frequency measurable at any point z of said optical fiber, and said photodetection module being capable of transmitting the received backscattering signal to a processing module capable of linking the modulation of the backscattering signal to a temperature value and a deformation value at any point z of said optical fiber to be tested.

Thus, the device used allows to eliminate all necessary preliminary checks when using a local oscillator having a Brillouin ring laser configuration. Indeed, in the configuration according to the invention, the return signal emitted by the reference fiber is a spontaneous and amplified (by stimulated scattering) scattering signal, and not the product of a resonance in a laser type cavity which would therefore greatly depend on the exact length of the cavity, difficult to control depending on the influence parameters such as the temperature.

In addition, this new architecture, including in particular the presence of a reference block positioned on the pump line, gives the user the possibility to measure the Brillouin anti-Stokes backscattering line. Such a configuration improves measurement quality by having a signal in the local oscillator without interference at low frequencies. It is therefore not necessary afterwards to use a low frequency electrical filter at the output of the photodetection module. Finally, such a configuration is less bulky and has lower power consumption. In addition, since the local oscillator consists only of the signal directly from the source laser, it does not include any element that could alter the quality of the signal.

According to another advantageous feature of the device, it may also comprise a third coupler and a fourth coupler, the third coupler being capable of dividing said continuous light signal from the light source into two signals of identical frequency distributed into two arms, a first arm connecting the third coupler to the first coupler and capable of transmitting to the first coupler a continuous light signal at a frequency $v_0$, a second arm connecting the third coupler to the fourth coupler located upstream of the modulator and capable of transmitting to the fourth coupler an initial signal at a frequency $v_0$, said fourth coupler being capable of coupling the initial signal $v_0$ to the light signal with a frequency $v_0-v_{bref}$ from the reference block.

This optional feature, based in particular on the presence of a series of couplers, gives the user the possibility to differentiate, in a single measurement and on a single fiber to be tested, between the temperature and the deformation parameter. It allows for a simultaneous measurement of the Brillouin backscattering anti-Stokes and Rayleigh backscattering line, and this from a single measurement, the latter always being located around the frequency $v_0+v_A$ ($.v_A$ in the electrical domain). This is particularly advantageous compared to the devices of the prior art which require two measurements to be carried out, for example via the use of two measuring devices (for example Brillouin and Raman).

Advantageously, the device has a backscattering signal containing the Rayleigh backscattering spectrum at a frequency $v_{rR}$ equal to $v_0+v_A$ and the Brillouin backscattering spectrum at a frequency $v_{rB}$ equal to $v_0-v_{bref}+v_A+v_{bAS}$. Preferably, there is no overlap between the two spectra. This allows to carry out a separate analysis of the influence of the temperature and the deformation. In addition, preferably, the photodetection module receives a signal from the Rayleigh backscattering modulated at the frequency of the acousto-optic modulator $v_A$ and from the Brillouin backscattering modulated at the frequency $v_{bAS}-v_{bref}+v_A$ without there being any overlap between the two spectra.

According to other optional features of the device:
the reference fiber is positioned on the same optical arm as the optical fiber to be tested. As the reference fiber is on the test arm, the local oscillator no longer includes any element that could alter the quality of the light signal propagating therein. Indeed, the local oscillator comes directly from the source laser and goes directly to the detection module. There is therefore an improvement in measurement quality.

the reference optical fiber of the reference fiber block has a Brillouin frequency different from that of the optical fiber to be tested.

the Brillouin frequency of the reference optical fiber has a frequency difference with the Brillouin frequency of the optical fiber to be tested, between 300 MHz and 1 GHz.

the second arm may include a polarization hybridization module, or a separation ("beam splitter") module, or a polarization jammer arranged in that case upstream of the inputs of a second coupler. Preferably, the second arm may include a polarization jammer arranged in that case upstream of the inputs of a second coupler. These elements allow to eliminate the polarization noise between the test arm and the local oscillator.

the pulse signal from the modulator has at least two components: a pulse component with a frequency $vp1=v_0-v_{bref}+v_A$, and a pulse component with a frequency $vp2=v_0+v_A$. In particular, the pulse signal from the modulator has two components: a pulse component with a frequency $vp1=v_0-v_{bref}+v_A$, and a pulse component with a frequency $vp2=v_0+v_A$. This results in a significant difference in performance and measurement quality compared to prior art devices. Such a pulse signal can be based on the fact that the local oscillator comes directly from the source laser and goes directly to the detection module.

The subject matter of the invention is also a method for digitally processing a signal for example from an optoelectronic distributed measuring device based on optical fiber according to the invention, said method comprising the following steps:

digitizing a signal corresponding to the beat between a backscattered signal from an optical fiber to be tested and a reference signal, and detected by a photodetection module, slicing said digitized signal into a plurality of slices (T1 ... Ti ... TN) by applying a sliding time window of the rectangular, or Hamming, or Hann, or Blackman-Harris window type, each slice having a width equal to the time width of a pulse of the pulse signal injected into the optical fiber to be tested, the width of each slice further being centered around a date t corresponding to a point of coordinate z of said optical fiber to be tested, computing, by using a discrete Fourier transform algorithm, the frequency spectrum of each slice (T1 ... Ti ... TN) of said digitized signal;

repeating the first three steps, and averaging the frequency spectra obtained for each point z of said optical fiber to be tested;

from the averaged frequency spectra, determining the variation of the frequency maxima of the Brillouin backscattering, and/or the variation of the total intensity of the Brillouin backscattering and/or the variation of the total intensity of the Rayleigh backscattering, as a function of the backscattering round-trip time $t_z$, applying, on the one hand, a temperature sensitivity coefficient and, on the other hand, a deformation sensitivity coefficient, on said one or more determined variations, in order to obtain a result in terms of temperature distributed measurement and/or a result in terms of deformation distributed measurement.

The method according to the invention relates to a digital processing of the signals applicable from the output of a photodetection module. The subsequent signal processing is carried out digitally at the spectral level and not directly on the signal. This processing particularly comprises performing a slicing of the digitized signal into a plurality of slices, the width of which is equal to the time width of a pulse of the pulse signal injected into the optical fiber to be tested. Thus, the duration of a measurement is relatively short compared to the measurement duration of the systems of the prior art. Typically, the duration of a measurement is from 1 to a few seconds for a 10 km fiber.

According to another advantageous feature of the method, it may comprise determining, from the averaged frequency spectra, the variation of the frequency maxima of the Anti-Stokes Brillouin backscattering and the variation of the total intensity of the Brillouin backscattering and the variation of the total intensity of the Rayleigh backscattering as a function of the backscattering round-trip time $t_z$, as well as determining the ratio of total Rayleigh intensity and total Brillouin intensity at any point (z) of the fiber. This ratio corresponds to Landau Placzek ratio.

This optional feature allows the user to differentiate, in a single processed measurement, between the temperature parameter and the deformation parameter. This is particularly advantageous compared to the methods of the prior art that require the use of signal processing from at least two measurements.

In addition, in the context of the digital processing method according to the invention, the digitized signal may advantageously have, slice by slice, at least two spectra corresponding to the Brillouin spectrum $v_A+((v_{bAS\,(z)}-v_{short})$ and the Rayleigh spectrum $v_A$.

Preferably, the digital processing method according to the invention may also comprise a sub-step of determining a ratio of total Rayleigh intensity to total Brillouin intensity at any point of the fiber in order to determine a Landau Placzek ratio dependent on the temperature parameter therefrom.

Figure 2:
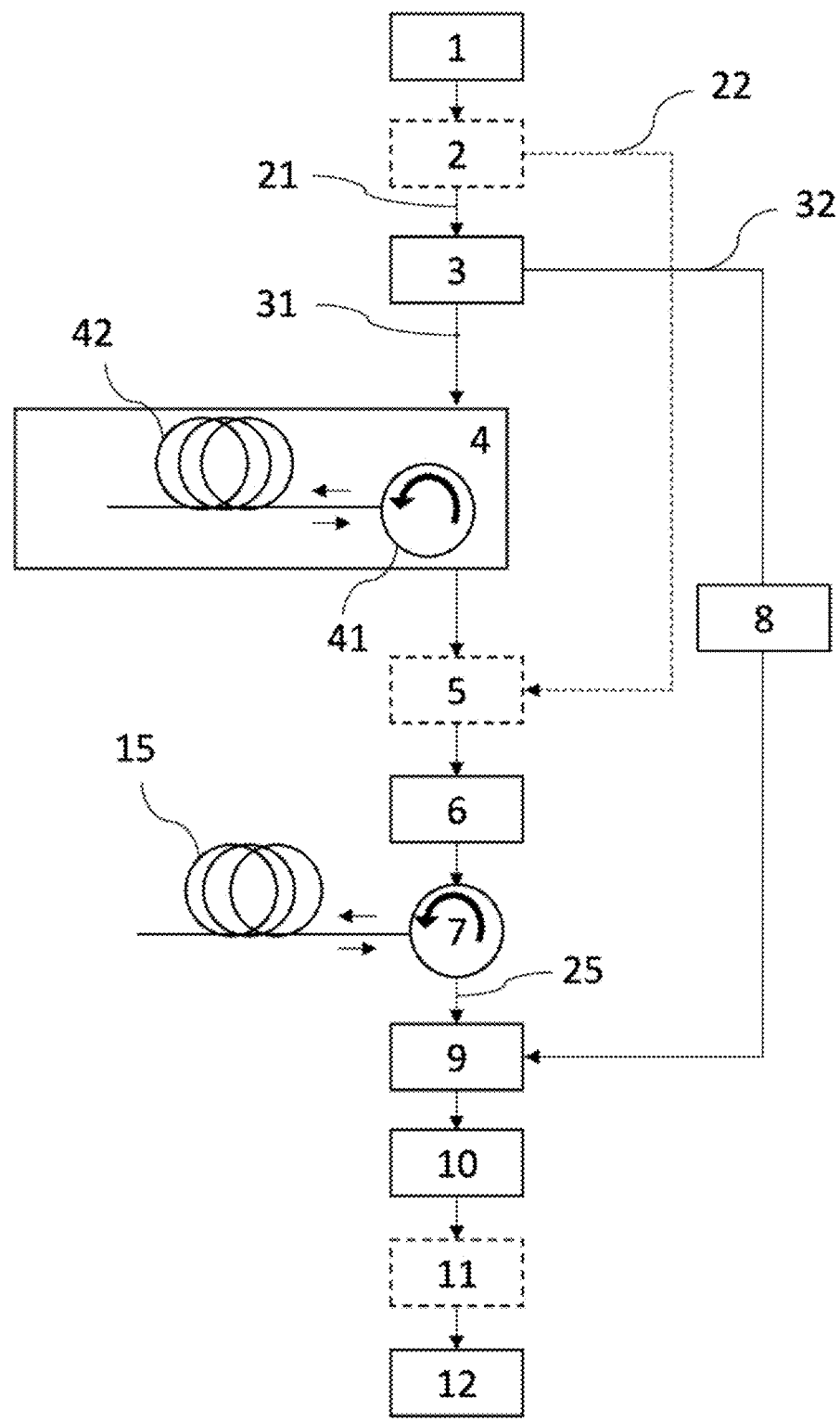
Figure 3A:
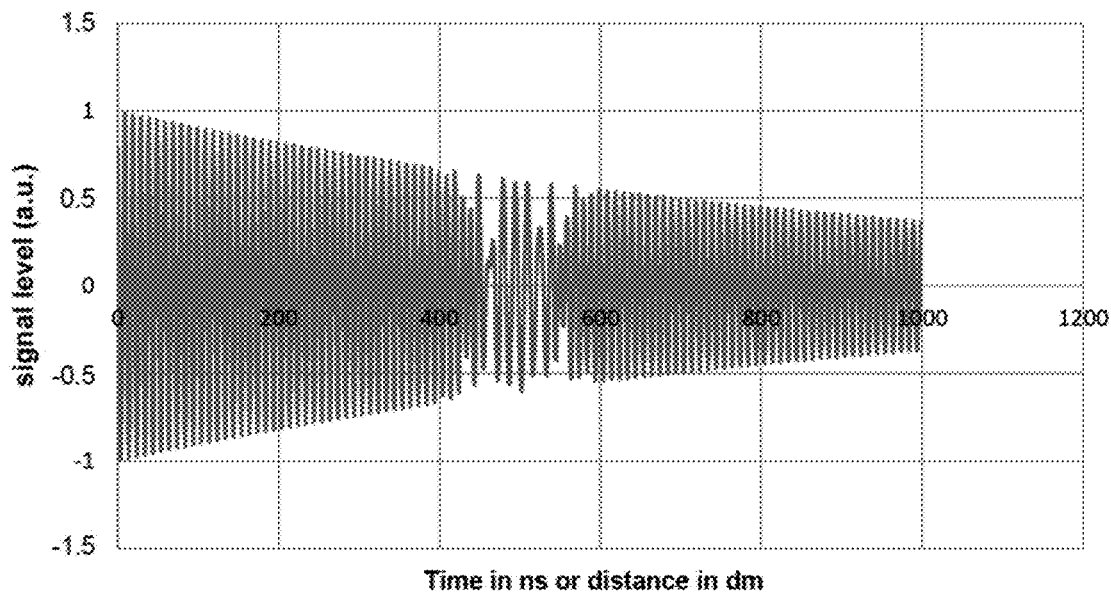
Figure 3B:
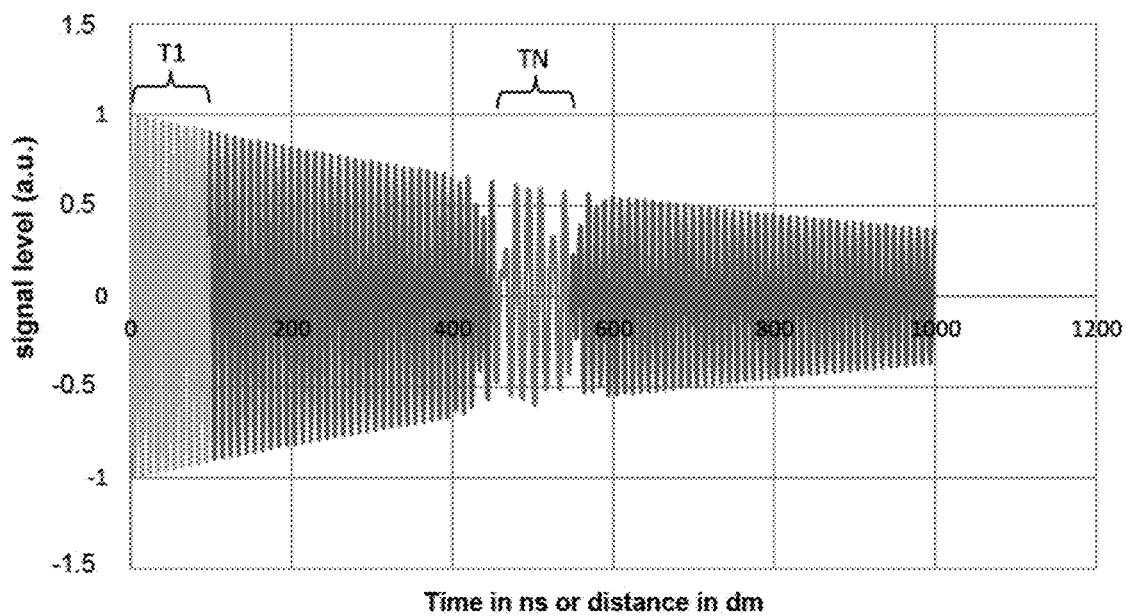
Figure 3C:
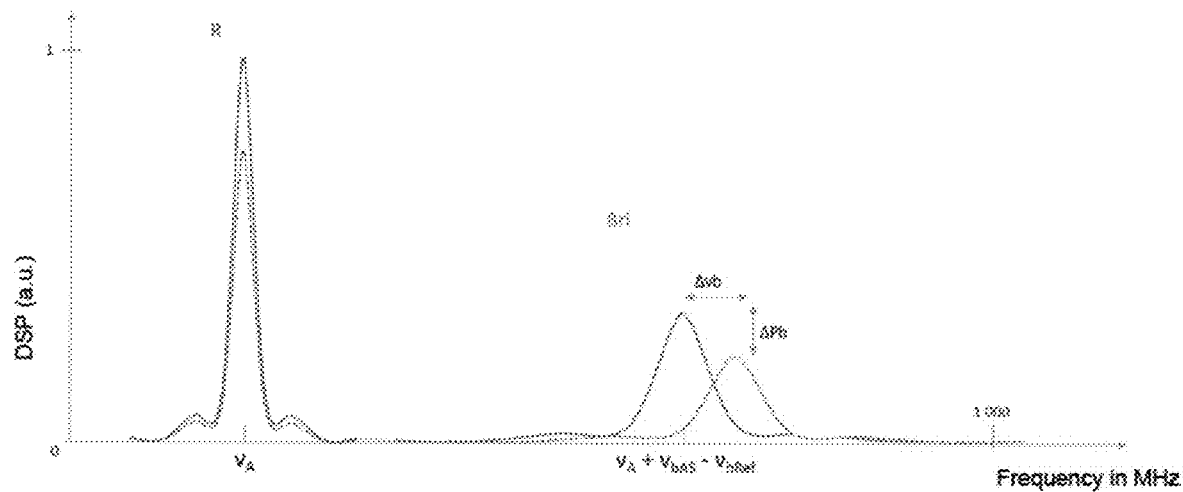
Figure 4A:
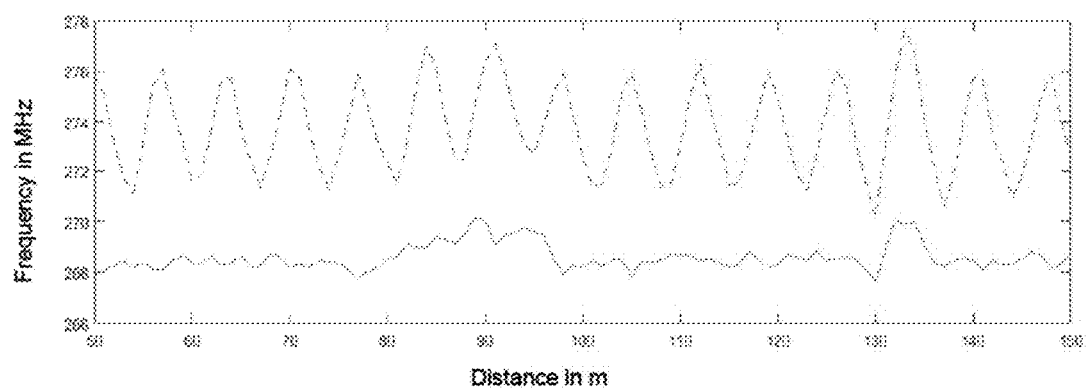
Figure 4B:
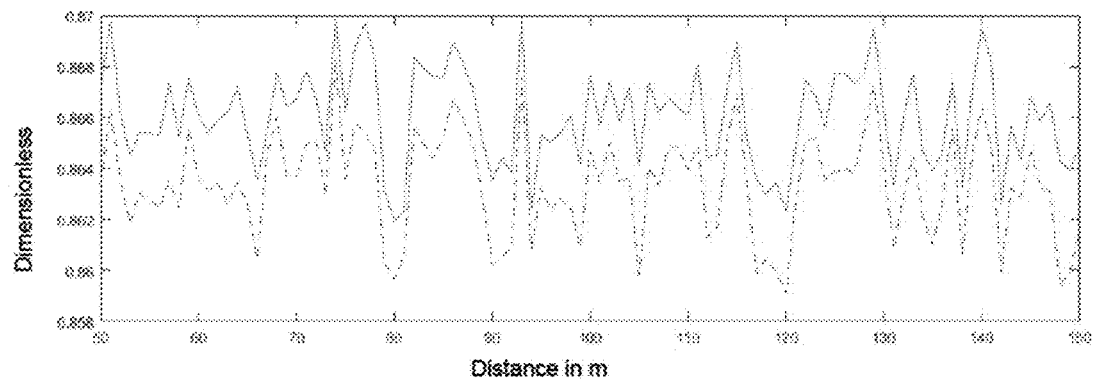
Figure 5A:
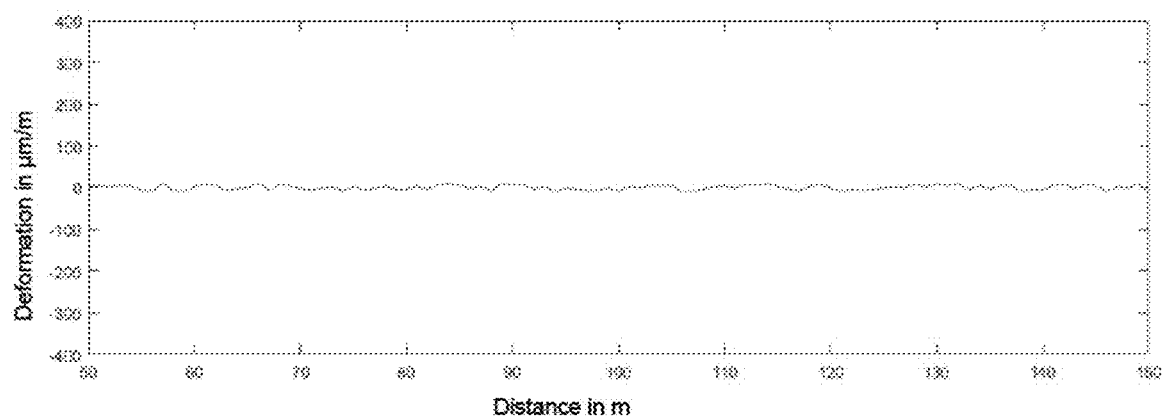
Figure 5B:
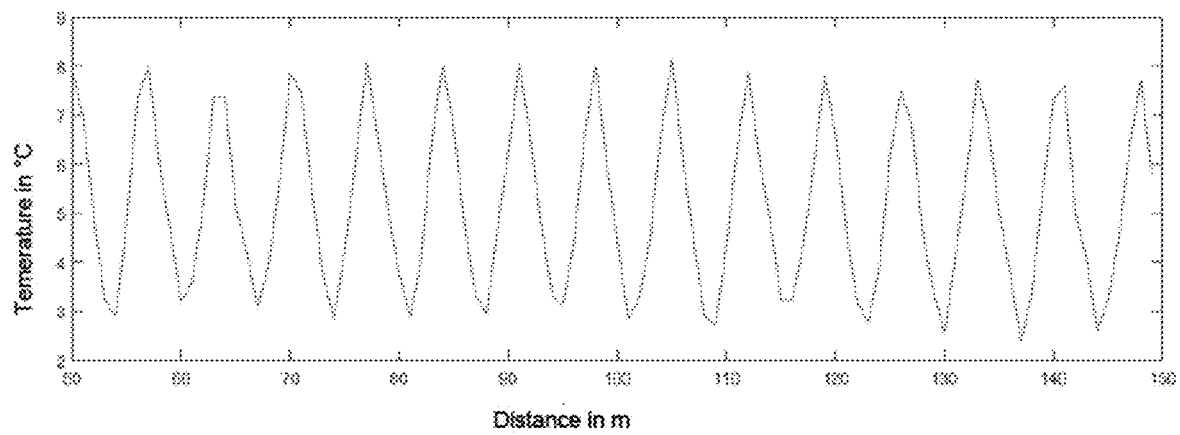

Other advantages and features of the invention will appear upon reading the following description given by way of illustrative and non-limiting example, with reference to the appended figures which represent:

FIG. 1, already described, a diagram of an optoelectronic distributed measuring device based on Brillouin backscattering according to the prior art, FIG. 2, a diagram of an optoelectronic distributed measuring device based on optical fiber according to the invention, the elements in dotted lines being optional elements, FIGS. 3A to 3C, time traces obtained in the first steps of the digitized signal processing method, and interpretable, averaged frequency spectra obtained following the fourth step of the method according to the invention relating to the T1 (solid line) TN (dotted line) slice, FIGS. 4A to 4B, the Brillouin frequency (4A) as well as the Landau Placzek ratio (4B) at two different temperatures, obtained from a set of diffusion spectra (Rayleigh and Brillouin) on a fiber with a length of about 150 m, FIGS. 5A to 5B, temperature (5A) and deformation (5B) distributed measurements, obtained on a 150-meter fiber with the device according to the invention, from a single measurement.

DETAILED DESCRIPTION OF THE INVENTION

Optical fiber to be tested (or under test) in the following refers to the optical fiber arranged along a work to be monitored and which allows a distributed measurement to be carried out.

By reference optical fiber is meant an optical fiber that can have a Brillouin frequency that is different, identical or substantially identical to the Brillouin frequency of the test fiber. This reference optical fiber is maintained throughout the measurement without deformation and at a reference temperature. The term optical fiber with a different Brillouin frequency refers to an optical fiber, the Brillouin frequency of which has a frequency deviation with respect to the Brillouin frequency of the optical fiber to be tested, of at least 200 MHz, and preferably a deviation of at least 300 MHz.

By "a single measurement" is meant a series of pulses for obtaining an averaged frequency spectrum.

By duration of a measurement is meant the time required for the system to display a measurement at the nominal accuracy in terms of deformation or temperature. This duration includes both:

the acquisition time,
the computing time of the system (Fourier transforms, averaging . . . )

By substantially or substantially identical is meant, within the meaning of the invention, a value varying by less than 30% with respect to the compared value, preferably by less than 20%, even more preferably by less than 10%.

By majority is meant, within the meaning of the invention, at least 50%.

The present invention relates generally to optoelectronic distributed measuring devices based on optical fiber. More specifically, the invention relates to an optoelectronic configuration of the device for increasing its accuracy, reducing its power consumption, reducing its bulk, reducing the duration of a measurement and providing a separate distributed measurement of the temperature and the deformation.

More particularly, FIG. 2 schematically shows the configuration of an optoelectronic distributed measuring device based on optical fiber according to the invention. The same references as in FIG. 1 are used to designate the same elements. The device according to the invention also comprises a light source 1 emitting a continuous light signal. This light source 1 is advantageously embodied by a laser, preferably a DFB (English acronym for "Distributed Feedback") laser, using a Bragg network. The emission wavelength $\lambda_0$ is preferably equal or substantially equal to 1550 nm, at the corresponding frequency $v_0$. The line of the emitted light wave is centered on the emission wavelength $\lambda_0$ and its width is at most 1 MHz.

Advantageously, the light source 1 is frequency tunable and its frequency can be continuously varied at a speed of at least 1 GHz/sec over an interval of at least 125 GHz. More preferably, the light source 1 is capable of emitting a continuous laser radiation at an optical frequency $v_0$ that can be varied, over the duration of all acquisitions, according to a continuous ramp of at least 250 GHz. This frequency modulation must be continuous and not by frequency steps and thus allows to reduce the effects of intra-pulse interference and therefore noise. This feature is particularly important when monitoring Rayleigh backscattering is desired.

The light source 1, for example a laser, emits a moderately powerful continuous light signal, typically of the order of 20 mW, in an optical fiber connecting it to a first coupler 3 or to the third coupler 2.

The first coupler 3, receiving the light signal via light source 1 or via the first arm 21 of the third coupler 2, is capable of dividing said continuous light signal into two signals of identical frequency distributed into two arms.

The first arm 31 connects the first coupler 3 to a reference fiber block 4 including a reference fiber 42, said reference fiber block 4 being capable of emitting another light signal with a frequency $v_0-v_{bref}$, where $v_{bref}$ is the Brillouin frequency of the reference fiber 42, intended to be transmitted to the modulator 6 or to be mixed with said initial signal by a fourth coupler 5. Thus, the reference block 4 allows the information to be sent back in a lower frequency band, thus improving the performance of the device. The reference optical fiber 42 is stored without deformation and at a reference temperature. The second arm 32 connects the first coupler 3 to a second coupler 9 located downstream of the modulator 6 and is capable of transmitting to the second coupler 9 a continuous light signal at a frequency $v_0$, thus constituting a local oscillator. More particularly, the second arm 32 connects the first coupler 3 to a second coupler 9 located upstream of the photodetection module 10 and preferably it is positioned just before said photodetection module 10.

The first coupler 3 is capable of directing sufficient energy of the light signal to the first arm 31 so as to exceed the Stimulated Brillouin Scattering (Stimulated Brillouin Scattering) threshold and thus, in the reference fiber 42, so that the backscattered wave is shifted by a frequency $-v_{bref}$ with respect to the optical wave. The first coupler 3 is advantageously capable of directing the majority of the energy of the light signal to the first arm 31. Preferably, the first coupler 3 is capable of directing more than 70%, more preferably more than 80%, even more preferably substantially 90% of the energy of the light signal to the first arm 31.

The reference block 4 advantageously comprises a circulator 41 which directs the incident continuous light signal, at the frequency $v_0$, from the first coupler 3, into a reference optical fiber 42. This reference optical fiber 42 may be identical to the optical fiber 15 to be tested. Advantageously, the reference fiber 42 is not subject to any deformation. It is placed at a reference temperature, generally between 18 and 25° C., preferably at a temperature of the order of 20° C. This reference fiber 42 also allows to emit a Brillouin backscattering signal in response to the continuous signal emanating from the light source 1, so that the reference block 4 allows to transform the incident frequency $v_0$ into a frequency $v_{br}=v_0-v_{Bref}$, where $v_{Bref}$ represents the Brillouin frequency of the reference optical fiber 42, and which is in the same frequency range as the frequency $v_{bAS}$ from the signal backscattered by the optical fiber 15 to be tested. In addition, the reference optical fiber 42 of the reference fiber block 4 advantageously has a Brillouin frequency different from that of the optical fiber 15 to be tested. For example, the reference optical fiber 42 has a Brillouin frequency shift of at least 200 MHz, preferably of at least 300 MHz compared to the Brillouin response of the fiber to be measured. Preferably, the Brillouin frequency of the reference optical fiber 42 has a frequency difference with the Brillouin frequency of the optical fiber 15 to be tested, between 300 MHz and 1 GHz. Thus, this avoids any spectral overlap of the Rayleigh and Brillouin spectra while limiting the requirements for subsequent signal processing. Indeed, the photodetection module 10 located at the end of the optoelectronic assembly receives a signal from the Rayleigh backscattering which is modulated at the frequency of the acousto-optic modulator $v_A$ (for example 200 MHz) and the Brillouin backscattering modulated at the frequency $(v_{bAS}-v_{bref}+v_A)$ without there being any overlap between the two spectra.

Such an architecture allows the reference fiber 42 to be on the same optical arm as the optical fiber 15 to be tested. This has the advantage of improving measurement quality by having a signal in the local oscillator directly from the source and therefore without low frequency interference. It is therefore not necessary to use a low frequency electrical filter at the output of the photodetection module. This configuration also allows to measure the anti-Stokes line of the Brillouin backscattering and, unlike the devices of the previous art, to access measurements close to the DC (for example around 100 MHz) in the electrical domain where it was not previously possible to make reliable measurements.

The third coupler 2 allows to divide the incident light signal emitted by the light source 1 into two signals of identical frequency distributed into two arms 21, 22 of the device.

The first arm 21 connects the third coupler 2 to the first coupler 3 and the first arm 21 is capable of transmitting to the first coupler 3 a continuous light signal at a frequency $v_0$. The second arm 22 connects the third coupler 2 to a fourth coupler 5 located upstream of the modulator 6 and this second arm 22 is capable of transmitting to the fourth coupler 5 an initial signal at a frequency $v_0$.

The third coupler 2 is advantageously capable of directing the majority of the energy of the light signal to the first arm 21. Preferably, the third coupler 2 is capable of directing more than 70%, more preferably more than 80%, even more preferably substantially 90% of the energy of the light signal to the first arm 21.

As specified, the fourth coupler 5 is capable of mixing the initial signal $v_0$ from the second arm 22 of the third coupler 2 with the light signal with a frequency $v_0-v_{bref}$ from the reference fiber 42 and injecting them into the modulator 6. The signals from the reference optical fiber 42 are therefore recombined with the initial signal $v_0$ in the fourth coupler 5. At the output of the fourth coupler 5, a signal containing a signal at the frequency $v_0-v_{bref}$ from the reference optical fiber 42 and a signal at the same frequency as the initial signal $v_0$, is obtained.

The modulator 6 is capable of imposing a frequency shift of at least 100 MHz on the continuous signal and transforming it into a pulse signal to be injected into an optical fiber 15 to be tested. Preferably, the modulator 6 is an acousto-optic modulator 6. The modulator 6 may be associated with one or more amplifiers if necessary to provide gain. The signal from the modulator 6 has at least two components, a continuous component with a frequency $v_0-v_{bref}$, transformed into an impulse component with a frequency $v_{p1}=v_0-v_{bref}+v_A$, and a continuous component with a frequency $v_0$, transformed into an impulse component with a frequency $v_{p2}=v_0+v_A$.

The modulator 6 is capable of generating a pulse signal having a frequency shifted from the frequency of the continuous light signal. The frequency shift $v_A$ applied to said shifted frequency may be greater than or equal to 100 MHz. The frequency $v_A$ is the natural frequency of the modulator 6 and is generally greater than or equal to 100 MHz and less than or equal to 1 GHz, preferably substantially equal to 200 MHz. The time width of the pulse thus generated may for example be between 10 ns and 500 ns, preferably it is substantially equal to 20 ns. The pulse signal is then directed to a circulator 7 which then injects it into the optical fiber 15 to be tested, on which the distributed measurement must be carried out. When the pulse signal passes, the optical fiber 15 transmits in the opposite direction a signal by spontaneous Brillouin backscattering at the frequency $v_{F1}=v_0-v_{bref}+v_A+v_{bAS(z)}$; and $v_0-v_{bref}+v_A-v_{bS(z)}$ where $v_{bAS}$ is the anti-Stokes Brillouin frequency to be measured at any point with a coordinate z along the optical fiber 15. $v_{bS(z)}$ is the Stokes Brillouin frequency. The optical fiber 15 also transmits in the opposite direction a signal by Rayleigh backscattering at the frequency $v_{F2}=v_0+v_A$.

These backscattered signals are directed, by the circulator 7, to the second coupler 9 where they are recombined with a signal $v_0$ from the local oscillator. In addition, the second arm 32 may advantageously include a polarization jammer 8 arranged in that case upstream of the inputs of a second coupler 9. This allows to reduce the interference effects due to the polarization between the local oscillator arm and the measuring arm 25, also called the "pump" arm, located between the circulator 7 and a second coupler 9.

The second coupler 9 is capable of coupling the signal from the local oscillator to the backscattering signal from the optical fiber 15 to be tested before transmitting it to the photodetection module 10. The second coupler 9 may be combined with optional modules such as a separation (beam splitter polarization) module or a polarization hybridization module. The backscattering signal may be modulated at least at a Brillouin frequency $v_{rB}$ equal to $v_0-v_{bref}+v_A+vbAS$, where vbAS is the anti-Stokes Brillouin backscattering frequency measurable at any point z of the optical fiber 15 to be tested. This gives the user the possibility to measure the Brillouin backscattering anti-Stokes line while taking advantage of a local oscillator without interference at low frequencies and thus improves measurement quality.

The backscattering signal from the optical fiber 15 to be tested may also be modulated at a Rayleigh frequency $v_{rR}$ equal to $v_0+v_A$. This is possible when the device according to the invention includes the third coupler 2 and the fourth coupler 5. This second coupler 9 then allows the Rayleigh backscattering created in the optical fiber 15 to be tested to couple with the frequency of the local oscillator. Thus, the device according to the invention also allows to measure the Rayleigh backscattering spectrum. Preferably, the backscattering signal is modulated, it contains the Rayleigh backscattering spectrum at a frequency $v_{rR}$ equal to $v_0+v_A$ and the Brillouin backscattering spectrum at a frequency $v_{rB}$ equal to $v_0-v_{bref}+v_A+v_{bAS}$.

This one or more beats are electronically detectable using a photodetection module 10 positioned downstream of the second coupler 9 and it is capable of transmitting the received backscattering signal to a processing module 12. The photodetection module 10 includes at least one photodetector. Advantageously, the photodetection module 10 has a bandwidth of at least 800 MHz, preferably at least 1 GHz. The photodetection module 10 located at the end of the optoelectronic assembly is capable of receiving a signal from the Rayleigh backscattering modulated at the frequency of the acousto-optic modulator $v_A$ and the Brillouin backscattering modulated at the frequency $(v_{bAS}-v_{bref}+v_A)$. Under these conditions, at the output of the photodetection module 10, the electrical signal obtained corresponding to the beats detected at the frequency $v_{Batt1}=v_A+(v_{bAS}-v_{Bref})$ corresponding to the Brillouin backscattering and at the frequency $v_{Batt2}=v_A$ corresponding to the Rayleigh backscattering. Thanks to the architecture of the device according to the invention, these beats were obtained from a single measurement and a single optical fiber 15 to be tested. In addition, these beats have a frequency lower than the incident signals because the frequency $v_0$ from the light source 1 is eliminated. Typically, a first beat corresponding to $v_{Batt1}=v_A+(v_{bAS}-v_{Bref})$ has a frequency greater than 200 MHz, and preferably around 500 MHz, and a second beat corresponding to $v_{Batt2}=v_A$ has a frequency for example substantially equal to 200 MHz, corresponding to the magnitude of the natural frequency of the modulator 6. Indeed, $v_A-(v_{bS}+v_{Bref})$ is at about 20 GHz and therefore out of band. The optical configuration therefore allows to increase the efficiency of the photodetection module 10 by limiting the bandwidth to less than 2 GHz instead of 11 GHz, preferably to less than 1 GHz, for example between 400 MHz and 1 GHz.

Advantageously, the device according to the invention may not include a low frequency electrical filter at the output of the photodetection module 10. Indeed, as previously specified, positioning the reference fiber 42 on the same optical arm as the optical fiber 15 to be tested allows to improve measurement quality by having a signal in the local oscillator without low frequency interference. By suppressing this low frequency interference, this configuration also gives access to information not usable with the configurations of the prior art (for example <100 MHz).

The one or more beat signals obtained can then be digitized, by means of an analog-to-digital converter module 11. They are then processed by a digital processing module 12. Advantageously, the analog-to-digital converter module 11 has a bandwidth of at least 800 MHz, preferably at least 1 GHz, and a sampling rate of at least 1.6 Gech/s, preferably at least 2 Gech/s.

The processing module 12 is configured to link said anti-Stokes Brillouin frequency $v_{BAS}$ to a temperature value and/or a deformation value at any point z of said optical fiber 15 to be tested. Thus, it is capable of separating the temperature measurement and the deformation measurement in order to obtain, from a single measurement, distinct temperature and deformation values. The latter may include an acquisition board for acquiring the signal generated by the photodetection module 10, and therefore having a bandwidth and a sampling frequency able to analyze a signal corresponding to: $v_A+v_{bAS}-v_{bref}$. Thus, advantageously, the processing module 12 is capable of measuring a signal with a bandwidth of at least 800 MHz, preferably at least 1 GHz, and a sampling rate of at least 1.6 Gech/s, preferably at least 2 Gech/s, in order to detect both spectra simultaneously (Brillouin spectrum and Rayleigh spectrum). In addition, it is advantageous to use an acquisition board with a high resolution, such as a resolution of 10 bits or more. This allows, considering the small variations in the intensity of the Brillouin backscattered spectrum as a function of temperature, to achieve an accuracy of around 1° C. The analog-to-digital converter module 11 and the processing module 12 are presented separately but can be integrated into a single assembly positioned directly after the photodetection module 10.

The processing module 12 is capable of slicing the digitized signal into a plurality of slices (T1 ... Ti ... TN) by applying a sliding time window of the rectangular, or Hamming, or Hann, or Blackman-Harris window type, each slice having a width equal to the time width of a pulse of the pulse signal injected into the optical fiber 15 to be tested, the width of each slice further being centered around a date t corresponding to a point of coordinate z of said optical fiber 15 to be tested.

In addition, the digital processing module 12 advantageously uses a discrete (preferably fast) Fourier transform algorithm, for example by means of a logic integrated circuit known by the English acronym FPGA (for "Field-Programmable Gate Array"). It thus allows to directly compute the Brillouin frequency, the total intensity of the Brillouin backscattering and/or the total intensity of the Rayleigh backscattering, at any point with a coordinate z of the optical fiber 15 under test. The digital processing module 12 further allows to average the spectra obtained in the frequency domain, for each point z of said fiber, upon completion of the application of the discrete (preferably fast) Fourier transform algorithm, in order to determine the distributed measurement of the frequency variation along said optical fiber 15 under test.

According to another respect, the invention relates to a method for digitally processing a signal that may be from, preferably is from, an optoelectronic distributed measuring device based on optical fiber according to the invention. The various steps of the digital processing performed on the digitized signal are more particularly illustrated by experimental and explanatory FIGS. 3 to 5 which represent time or spectrum traces obtained at each step of the method for digitally processing the digitized signal, obtained after recombination of the signals backscattered by the optical fiber under test and by the reference optical fiber.

The processing method according to the invention includes a first step of digitizing a signal corresponding to the beat between a backscattered signal from an optical fiber 15 to be tested and a reference signal and detected by a photodetection module 10. FIG. 3A shows the digitized signal at the output of the analog-to-digital converter 11. Preferably, the digitized signal comes from a single measurement and the processing method according to the invention only relies on one measurement carried out on one optical fiber 15 to be tested. Preferably, the signal includes a beat $v_A+(v_{bAS}-v_{Bref})$ and a beat $v_A$.

A second step of the digital processing performed by the digital processing module 12 consists in slicing the digitized signal into slices. The first step consists in slicing the digitized signal into slices around the date t corresponding to the position z on the fiber of a width equal to the time width of the pulse. Slicing into slices is carried out, for example, by applying a sliding time window on the signal. Preferably, windowing is performed by a rectangular, or Hamming, or Hann, or Blackman-Harris window. Slicing of the digitized signal is shown in FIG. 3B, a first slice to be processed being identified by the reference T1, and the slice N being identified by the reference TN. Each slice advantageously has a width equal to the time width of a pulse of the pulse signal injected into the optical fiber 15 to be tested. Each slice T1 . . . Ti . . . TN is further centered around a date corresponding to a point of coordinate z of said optical fiber to be tested. Thus, for a position of coordinate z on the optical fiber 15, $z=2nc*t$, with c being the speed of light and n the refractive index of the optical fiber, and the time $t_z$ then corresponds to the round-trip time (z) of a pulse, counted from the start point of the pulse to the measurement point z. The difference between two measurement points may be as small as one sampling unit (sliding of an interval). However, the difference between two independent measurements (spatial resolution) is considered to be equal to the width of the pulse. Thus, the difference between two independent measurement points z(t1), z(t2) is equal to the width of a pulse.

Preferably, the digitized signal has, slice by slice, at least two spectra corresponding to the Brillouin spectrum $v_A+(v_{Bas(z)}-v_{Bref})$ and the Rayleigh spectrum $v_A$. A third step of digitally processing then consists in computing the frequency spectrum of each slice T1 . . . Ti . . . TN of said digitized signal, by using a Discrete Fourier Transform, DFT, algorithm and preferably a Fast Fourier Transform, FFT, algorithm. Thus, a frequency spectrum is obtained for each slice T1 . . . Ti . . . TN of the digitized signal.

A fourth step consists in repeating the three steps of digitizing, slicing and computing the frequency spectrum, and averaging the results in order to obtain an interpretable averaged frequency spectrum. Preferably, the fourth step allows to generate an interpretable frequency spectrum including a Brillouin spectrum and a Rayleigh spectrum, where it is possible to determine the maximum for the Brillouin frequency measurement, the energy for the Brillouin intensity measurement, and the energy for the Rayleigh intensity measurement. It is about averaging the DFT (and preferably FFT) curves to reduce background noise as much as possible. For example, a Gaussian or Lorentz adjustment algorithm is used. Two interpretable averaged frequency spectra are shown in FIG. 3C corresponding to the T1 slice (solid line) and the TN slice (dotted line) of the sliced signal in FIG. 3B. These interpretable averaged frequency spectra allow to obtain the frequency of the beats $v_A+(v_{bAS(z)}-v_{Bref})$ and $v_A$. And, for example, to determine for the beat $v_A+(v_{bAS(z)}-v_{Bref})$ the frequency position of the Brillouin spectrum maxima.

The fifth step of the digital processing then consists in determining the variation in the frequency positions of the maxima of the Brillouin spectrum and/or the total intensity of the Brillouin and Rayleigh spectra, as a function of the coordinates z of the different points of the optical fiber 15, and may include a step of plotting one or more graphs of the maxima variation distributed measurement frequency or intensity all along the optical fiber 15 to be tested. Preferably, the fifth step of digital processing consists in determining the frequency positions of the Brillouin spectrum maxima and the total intensity of the Rayleigh and Brillouin spectra, respectively, as a function of the coordinates z of the different points of the optical fiber 15. For example, FIG. 4A shows the frequency positions of the Brillouin spectrum maxima as a function of the coordinates z of the optical fiber 15 to be tested under two different conditions: in a homogeneous temperature environment (solid line) and in an environment where the optical fiber 15 is exposed to a heat source (dotted line). This fifth step may also comprise a sub-step of determining the ratio of total Rayleigh intensity and total Brillouin intensity at any point (z) of the fiber in order to determine therefrom the Landau Placzek ratio dependent on the temperature parameter. Only temperature variations created on an optical fiber result in an increase or decrease in the intensity of Brillouin backscattering. This intensity can be normalized by means of a Rayleigh backscattering measurement which allows to provide information on linear losses of the tested fiber, as well as the defects of the latter that can cause optical losses. This normalization requires the calculation of the Landau Placzek ratio. For example, FIG. 4B shows the Landau Placzek ratio as a function of the coordinates z of the optical fiber 15 to be tested under the two conditions above. The intensity of the Brillouin backscattering spectrum varies depending on the temperature parameter. However, in order to obtain a representative measurement of the Brillouin intensity, it is necessary to normalize the Brillouin backscattering intensity by the Rayleigh backscattering intensity (representative of optical losses in a fiber). In this way, only the intensity variations on the Brillouin backscattered spectrum due only to temperature are measured. The variation may, for example, be measured against values of frequency positions of the maxima, and/or total intensity, obtained from a previous measurement. Said values being a function of the coordinates z of the different points of the optical fiber 15.

Finally, a last step of the digital processing consists in applying the sensitivity coefficient specific to the optical fiber 15 to be tested to the variations in frequency positions and/or to the variations in total intensities of the Rayleigh and Brillouin spectra determined upstream. This allows to obtain two results corresponding to a deformation distributed measurement and a temperature distributed measurement. This was not possible from a single measurement with the methods of the prior art since $v_{Bas(z)}$ depends on these two parameters. Moreover, in the methods of the prior art, these measurements could be obtained by an analysis of the Brillouin and Raman spectra, the acquisition of which requires two different devices and therefore necessarily two measurements.

In particular, the last step of the digital processing consists in applying the sensitivity coefficients, of temperature $C_T$ and deformation $C_\varepsilon$, respectively, specific to the optical fiber 15, to obtain a result in terms of temperature distributed measurement and deformation distributed measurement, respectively. FIGS. 5A and 5B show a graph obtained after applying the deformation sensitivity coefficient for obtaining the deformation ε distributed measurement all along the optical fiber and the temperature T distributed measurement all along the optical fiber, respectively. Thus, in the graph in FIG. 5A, it can be seen that the optical fiber analyzed is not deformed, whereas in FIG. 5B there is a periodic variation in temperature corresponding to the presence of a heat source in the vicinity of the coiled optical fiber 15. The deformation sensitivity coefficient Cvbε is typically 0.05 MHz/(μm/m)) and the temperature sensitivity coefficient CvbT is typically 1 MHz/° C.

More particularly, these measurements can be determined by inverting the linear system (1).

$$\begin{bmatrix} \Delta vb \\ \Delta Pb \end{bmatrix} = \begin{bmatrix} Cvb\varepsilon & CvbT \\ CPb\varepsilon & CPbT \end{bmatrix} \times \begin{bmatrix} \delta\varepsilon \\ \delta T \end{bmatrix} \quad \text{Linear system (1)}$$

With $CPb\varepsilon$ that can be considered to be zero in relation to $CPbT=0.32\%/°$ C.

The invention allows for all the analog electronic components to be deleted, except for the photodetection module 10, and allows them to be replaced by a digitizer 11 and a digital processing module 12. Thus, noise levels caused by the active analog components, such as amplifiers or oscillators for example, are eliminated. In addition, since the signal processing is entirely digital, processing is less energy consuming and the device is less bulky, so that it can be an onboard device. It can therefore advantageously be powered with a low voltage, typically 12 or 24 volts, from a battery. This battery can also be rechargeable, for example by an insulated solar panel, the power requirement of which is of the order of 100 continuous Watt. In addition, the device is operable by accessing only one end of the optical fiber 15 to be tested, and as seen, it is capable of separately measuring the temperature and the deformations in the optical fiber 15 to be tested in a single measurement.

In addition, the device allows to use a digital computing module for performing parallel processing for each slice, which reduces the measurement-to-acquisition duration time, for example for a 10 km fiber, it will be possible to have 10,000 acquisitions per second with a processor clock frequency of 10 kHz, and therefore obtain 10,000 averages. The digital computing module advantageously includes a graphic processor of the GPU (Graphical Processing Unit) type so as to defer the highly parallelizable computing thereon. Thus, computing is performed in parallel with the acquisition and the duration of a measurement corresponds to the acquisition time. This acquisition time is low compared to the acquisition time of the devices of the prior art. For an exemplary 10 km fiber, with a processor clock frequency of 10 kHz, 10,000 acquisitions are performed in one second which allows to have 10,000 averages, whereas in the state of the art the duration of a measurement is greater than one minute for 10 km.

The use of the measurements returned by this device is devoted to optimizing the maintenance of civil engineering works or oil and gas works, for example. The continuity of the measurements along the optical fiber guarantees the detection of an event that would not have been detected by another method using isolated and localized measurements. Early detection of structural disorders in works allows for an intervention before further degradation. Conversely, the absence of detection can allow routine maintenance operations to be delayed if they are not necessary. In both cases, such an optoelectronic distributed measuring device based on optical fiber allows an operator to achieve significant savings on the maintenance of civil engineering works.

The invention claimed is:

1. An optoelectronic distributed measuring device based on optical fiber, said device comprising a continuous light source emitting a continuous light signal at a first frequency $v_0$, a modulator capable of imposing a frequency shift $v_A$ of at least 100 Mhz on the continuous signal and transforming it into a pulse signal to be injected into an optical fiber to be tested, and a photodetector capable of detecting a backscattering signal from the optical fiber to be tested, resulting from a spontaneous Brillouin backscattering and/or a Rayleigh backscattering from said optical fiber to be tested, a first coupler and a second coupler, said first coupler being capable of dividing said continuous light signal into two signals of identical frequency distributed into a first arm and a second arm, said first arm connecting the first coupler to a reference fiber block including a reference fiber, said reference fiber block being capable of emitting another light signal with a frequency $v_0-v_{bref}$, where $v_{bref}$ is the Brillouin frequency of the reference fiber without deformation and at a reference temperature, said second arm connecting the first coupler to the second coupler located upstream of the photodetector and capable of transmitting to the second coupler a continuous light signal at a frequency $v_0$, thus constituting a local oscillator, said second coupler being capable of coupling the signal of the local oscillator to the backscattering signal from said optical fiber to be tested before transmitting it to the photodetector, the backscattering signal being modulated at a frequency $v_{rB}$ equal to $v_0-v_{bref}+v_A+v_{bAS}$, where $v_{bAS}$ is the anti-Stokes Brillouin backscattering frequency measurable at any point z of said optical fiber where $v_A$ is the natural frequency of the modulator, and said photodetector being capable of transmitting the received backscattering signal to a processor capable of linking modulation of the backscattering signal to a temperature value and a deformation value at any point z of said optical fiber (15) to be tested.

2. The device according to claim 1, wherein the reference optical fiber has a Brillouin frequency shift of at least 200 MHz compared to the Brillouin response of the optical fiber to be tested.

3. The device according to claim 1, further comprising an analog-to-digital converter module having a bandwidth of at least 800 MHz and a sampling frequency of at least 1.6 GS/s.

4. The optoelectronic distributed measuring device based on optical fiber according to claim 1, said device being operable by accessing only one end of the optical fiber to be tested.

5. The optoelectronic distributed measuring device based on optical fiber according to claim 1, said device being capable of separately measuring temperature and deformations in the optical fiber to be tested in a single measurement.

6. The optoelectronic distributed measuring device based on optical fiber according to claim 1, wherein the processor is capable of slicing a digitized signal into a plurality of slices (T1 . . . Ti . . . TN) by applying a sliding time window of the rectangular, or Hamming, or Hann, or Blackman-Harris window type, each slice having a width equal to the time width of a pulse of the pulse signal injected into the optical fiber to be tested, the width of each slice further being centered around a time t corresponding to a point of coordinate z of said optical fiber to be tested.

7. The optoelectronic distributed measuring device based on optical fiber according to claim 1, wherein the reference fiber is positioned on the same optical arm as the optical fiber to be tested.

8. The optoelectronic distributed measuring device based on optical fiber according to claim 1, wherein the second arm can include a polarization hybridization module, or a separation module, or a polarization jammer, arranged in that case upstream of the inputs of the second coupler.

9. The optoelectronic distributed measuring device based on optical fiber according to claim 1, wherein the pulse signal from the modulator includes at least two components, a pulse component with a frequency $vp1=v_0-v_{bref}+v_A$, and a pulse component with a frequency $vp2=v_0+v_A$.

10. The optoelectronic distributed measuring device based on optical fiber according to claim 1, wherein the photodetector receives a signal from the Rayleigh backscattering modulated at the frequency of the acousto-optic modulator $v_A$ and from the Brillouin backscattering modulated at the frequency $v_{bAS}-v_{bref}+v_A$ without there being any overlap between the two spectra.

11. The device according to claim 1, further comprising a third coupler and a fourth coupler, the third coupler being capable of dividing said continuous light signal from the light source into two signals of identical frequency distributed into a third arm and a fourth arm,
    said third arm connecting the third coupler to the first coupler and capable of transmitting to the first coupler a continuous light signal at a frequency $v_0$,
    said fourth arm connecting the third coupler to the fourth coupler located upstream of the modulator and capable of transmitting to the fourth coupler an initial signal at a frequency $v_0$,
said fourth coupler being capable of coupling the initial signal $v_0$ to the light signal with a frequency $v_0-v_{bref}$ from the reference block.

12. The device according to claim 11, wherein the backscattering signal contains the Rayleigh backscattering spectrum at a frequency $v_{rR}$ equal to $v_0+v_A$ and the Brillouin backscattering spectrum at a frequency $v_{rB}$ equal to $v_0-v_{bref}+v_A+v_{bAS}$.

13. The optoelectronic distributed measuring device based on optical fiber according to claim 1, wherein the reference optical fiber of the reference fiber block has a Brillouin frequency different from that of the optical fiber to be tested.

14. The optoelectronic distributed measuring device based on optical fiber according to claim 13, wherein the Brillouin frequency of the reference optical fiber has a frequency difference with the Brillouin frequency of the optical fiber to be tested, between 300 MHz and 1 GHz.

15. A method for digitally processing a signal from an optoelectronic distributed measuring device based on optical fiber according to claim 1, said method comprising the following steps:
    digitizing a signal corresponding to the beat between a backscattered signal from an optical fiber to be tested and a reference signal, and detected by a photodetector;
    slicing said digitized signal into a plurality of slices (T1 ... Ti ... TN) by applying a sliding time window of the rectangular, or Hamming, or Hann, or Blackman-Harris window type, each slice having a width equal to the time width of a pulse of the pulse signal injected into the optical fiber to be tested, the width of each slice further being centered around a time t corresponding to a point of coordinate z of said optical fiber to be tested;
    computing, by using a discrete Fourier transform algorithm, the frequency spectrum of each slice (T1 ... Ti ... TN) of said digitized signal;
    repeating the first three steps, and averaging the frequency spectra obtained for each point z of said optical fiber to be tested;
    from the averaged frequency spectra, determining the variation of the frequency maxima of the Brillouin backscattering, and/or the variation of the total intensity of the Brillouin backscattering and/or the variation of the total intensity of the Rayleigh backscattering, as a function of the backscattering round-trip time $t_z$; and
    applying, on the one hand, a temperature sensitivity coefficient and, on the other hand, a deformation sensitivity coefficient, on said one or more determined variations, in order to obtain a result in terms of temperature distributed measurement and/or a result in terms of deformation distributed measurement.

16. The digital processing method according to claim 15, further comprising determining, from the averaged frequency spectra, the variation of the frequency maxima of the Anti-Stokes Brillouin backscattering and the variation of the total intensity of the Brillouin backscattering and the variation of the total intensity of the Rayleigh backscattering as a function of the backscattering round-trip time $t_z$, as well as determining the ratio of Rayleigh intensity and Brillouin intensity at any point (z) of the fiber.

17. The digital processing method according to claim 15, wherein the digitized signal has, slice by slice, at least two spectra corresponding to the Brillouin spectrum $v_A+((v_{bAS\ (z)}-v_{bref})$ and the Rayleigh spectrum $v_A$.

18. The digital processing method according to claim 15, further comprising a sub-step of determining a ratio of total Rayleigh intensity to total Brillouin intensity at any point (z) of the fiber in order to determine a Landau Placzek ratio dependent on the temperature parameter therefrom.

* * * * *